H. E. TOWNSEND.
GEARING.
APPLICATION FILED MAR. 15, 1912.

1,101,478.

Patented June 23, 1914.
3 SHEETS—SHEET 1.

H. E. TOWNSEND.
GEARING.
APPLICATION FILED MAR. 15, 1912.

1,101,478.

Patented June 23, 1914.
3 SHEETS—SHEET 2.

UNITED STATES PATENT OFFICE.

HARRY E. TOWNSEND, OF BROOKLYN, NEW YORK, ASSIGNOR TO JOHN JABURG AND HUGO JABURG, COMPOSING FIRM OF JABURG BROS., OF NEW YORK, N. Y.

GEARING.

1,101,478.  Specification of Letters Patent.  Patented June 23, 1914.

Original application filed October 29, 1911, Serial No. 657,277. Divided and this application filed March 15, 1912. Serial No. 684,078.

*To all whom it may concern:*

Be it known that I, HARRY E. TOWNSEND, a citizen of the United States of America, residing at Brooklyn, in the county of Kings and State of New York, have invented certain new and useful Improvements in Gearing, of which the following is a specification.

My invention relates to sifting machines and it consists particularly in the peculiar arrangements of the driving mechanism whereby I am enabled to readily adjust the machine for various drives, and in various other features as set forth in the claim.

Figure 1:
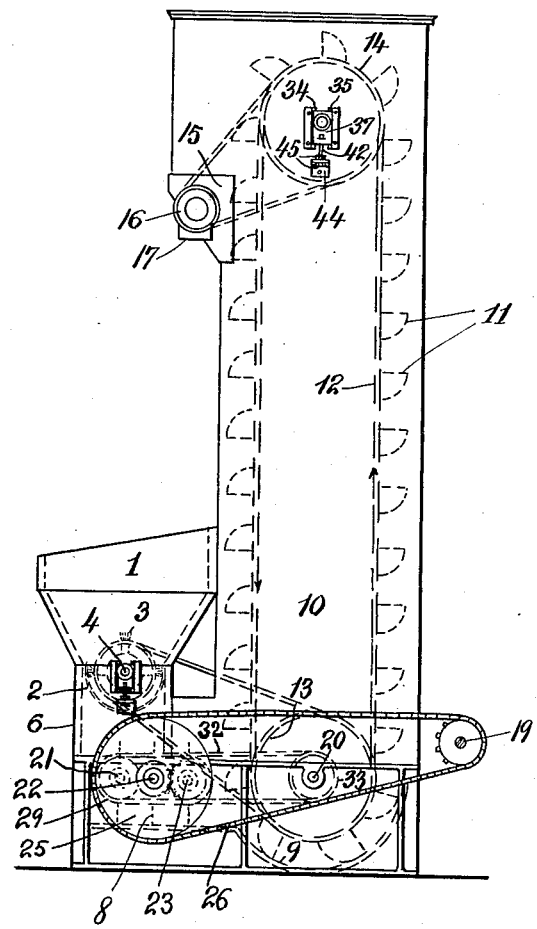
Figure 2:
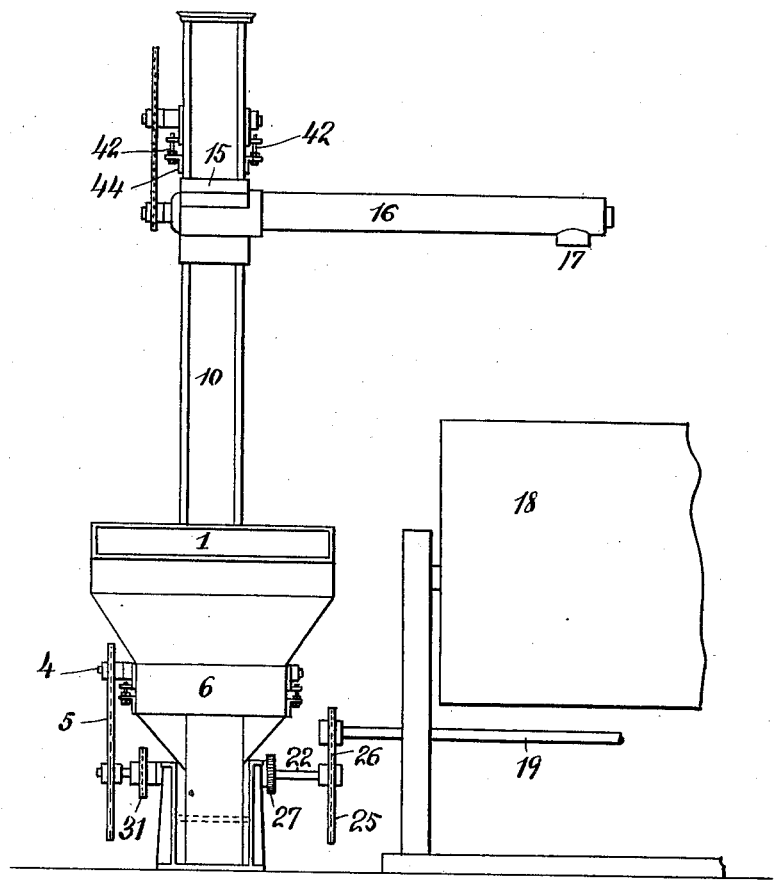
Figure 3:
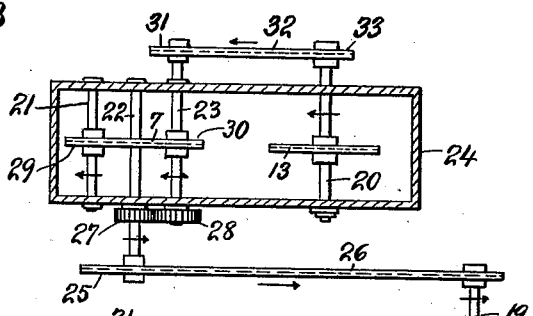
Figure 4:
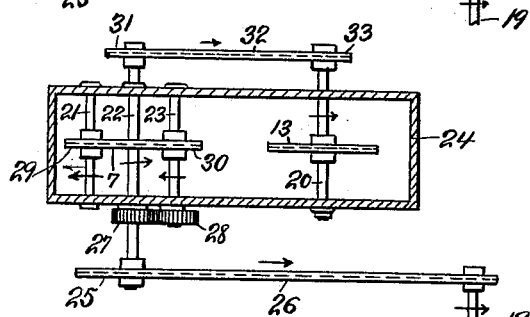
Figure 5:
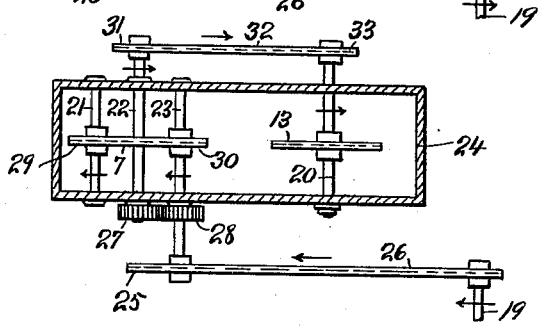

Figure 1, is a side elevation of a sifter embodying my invention. Fig. 2, is a front view of the same, showing also the driving shaft and a portion of the dough mixing trough. Figs. 3, 4, and 5, represent various arrangements of the gears, which by reason of my invention, may be made without reconstructing the machine.

In the device shown in 1, is a hopper intended and adapted to receive a quantity of flour.

2, is a sieve or sifter at the bottom of the hopper.

3 represents one of a series of brushes mounted on a shaft 4, which is adapted to be turned by a chain belt, 5, to cause the flour to be sifted through the sieve 2. It then falls into a receiver 6, whence it is conveyed by an endless chain 7, provided with scrapers or blades 8, to the bottom 9, of the elevator 10. This elevator consists of a hollow shaft or box, preferably of wood in which I place a series of buckets 11, attached to an endless chain 12, which passes around two wheels 13 and 14, one at the bottom and one at the top of the elevator. As these buckets move through the bottom 9, of the elevator, they scoop up the flour, convey it up and over the wheel, at the top, and discharge it into a trough or box, 15, whence by screw conveyer 16, it is carried out to the discharge opening 17, and thence dropped into the dough mixer 18.

As will be noted, it is always necessary that the endless chain 7, carrying blades 8, should move in a direction which when viewed as shown in Fig. 1, will be the reverse to that of the hands of a clock, in order that the blades may carry the flour from the receiver 6, to the bottom of the elevator shaft, but it is not always convenient to have the driving chain turned in such direction as to secure this movement by a direct attachment. Again when designed to secure the proper movement by direct attachment, if the device should be set in a different way or connected to a power shaft with a reverse movement, the conveyer mechanism would be wholly inoperative because the blades would pass toward the elevator shaft when above their driving wheels and thus fail to carry the flour as desired.

Having designed my sifter, as already noted, to be driven from a shaft other than the elevator shaft 20, I proceed as follows: At the end of the machine, almost immediately beneath the hopper, I locate three shafts 21, 22, 23. The bearings for these shafts, in the case 24, are exactly similar, so that either shaft 21, 22, 23 may be set in either of the bearings in said casing. Now if the movement of the driving shaft 19, resembles that of the hands of a clock, I leave shaft 21, in its normal position, place shaft 22 between it and shaft 23, as seen in Fig. 3, then I place a sprocket wheel 25, on shaft 22, and connect that wheel with shaft 19, by a link chain 26, as shown. On shaft 22 outside of the casing I place a gear 27, and on shaft 23, I place a corresponding gear 28, meshing with gear 27, then I extend the endless chain 7, around wheels 29 and 30 respectively, placed on shafts 21 and 23. The result is that as chain 26 moves in the direction of the arrow of Fig. 3, gear 27 will rotate as do the hands of a clock, gear 28, will of course have a reverse movement and that movement will carry the chain 7, and its accompanying blades in the proper direction. On the end of shaft 23, opposite to that carrying gear 28, I place a sprocket wheel 31, carrying a chain 32, which also passes over a sprocket wheel 33, on shaft 20, making the proper movement to carry the buckets in the direction shown by the arrow in Fig. 1. The belt or chain 5, transfers motion from shaft 20, to the shaft 4, already described. Now if it should be desired to reverse the movements of the bucket and still retain proper movements for the blades 18, I would arrange the device as shown in Fig. 4, the difference being that instead of securing sprocket wheel 31, to shaft 23, I would secure it to an extended end of shaft 22, thus I am enabled to secure the same movement for the blades 8, and yet the reverse movement for the shaft 20. Now if shaft 19 move in a counter-clockwise direction, and I desire to move the blade conveyer as before and the bucket conveyer exactly as illustrated in Fig. 4, I shift shaft 22, to the former location of shaft 23 and shaft 23 to the former location of shaft 22. This results in turning shaft 22, and its sprocket wheel in a direction reversed to that of the hands of a clock, thereby giving the proper movement to the chain 7, and its blades or carriers 8. The movement of shaft 22, through gear 27, and 28, causes a movement of shaft 23, in the same direction as that of shaft 22, of Fig. 4, with corresponding results to the mechanism thereby driven. These shafts I secure in any of the positions noted by collars and the sprocket wheels are secured upon such shafts as wished, by set screws or keys, in suitable key ways. It is manifest that when the casing is constructed as described, and the shafts are interchangeable as related, one machine may be set up in whatever variant combination may be desired to accommodate the situation and movement of a power shaft already in place, and that special locations do not need to be chosen. Nor does the machine need to be newly designed for each position it is to occupy. It would however speedily become ineffective by reason of the stretching of the chain which carries the elevator buckets, were no provisions made for taking up the slack of that chain and to accomplish this result I provide the adjustable bearing shown at the upper part of Fig. 1. I have found it also advisable to use a pair of these blocks for the support of the shaft 4, as clearly shown in Fig. 1.

What I claim as new and desire to secure by Letters Patent, is:—

In a device including a belt intended to move substantially horizontally and another belt intended to move up and down, the combination of a frame, adapted to support the wheels about which said belts are carried and provided with journal bearings for four shafts, four shafts, two of which carry wheels for the horizontal belt and one of them a wheel for the up and down belt, at least two of the said sets of journal bearings being similar and adapted to interchangeably receive and carry either of two of said shafts with similar journals, a power drive geared to one of said shafts, gears on each of the interchangeable shafts adapted to intermesh one with the other, together with connections, substantially as set forth, adapted to transmit motion from one shaft to another, whereby an initial impulse of the power drive, from either direction, may be so transmitted so as to drive the horizontal belt in but one direction, all substantially as set forth.

In testimony whereof, I have signed my name to this specification in the presence of two subscribing witnesses, this 11th day of March, 1912.

HARRY E. TOWNSEND.

Witnesses:
EDWARD BIGGS,
W. STELLWAGEN.

---

Copies of this patent may be obtained for five cents each, by addressing the "Commissioner of Patents, Washington, D. C."